United States Patent [19]

Duenow

[11] 4,367,062
[45] Jan. 4, 1983

[54] BALE CARRYING DEVICE

[76] Inventor: Michael C. Duenow, Rte. 5, Fulton, Mo. 65251

[21] Appl. No.: 161,163

[22] Filed: Jun. 19, 1980

[51] Int. Cl.³ .................... B60P 1/04; A01D 87/12
[52] U.S. Cl. ............................ 414/24.5; 414/740
[58] Field of Search ............... 414/703, 714, 704, 685, 414/711, 733, 734, 736, 740, 622, 434, 436, 24.5

[56] References Cited

U.S. PATENT DOCUMENTS

| 2,505,639 | 4/1950 | Eaton | 414/685 |
|---|---|---|---|
| 2,587,769 | 4/1952 | Rowe | 414/733 |
| 2,848,125 | 8/1958 | Irvine | 414/740 |
| 2,999,608 | 9/1961 | Ganahl | 414/622 |
| 3,164,405 | 1/1965 | Lull | 414/622 |
| 3,409,157 | 11/1968 | Lull | 414/622 |
| 3,876,090 | 4/1975 | Holland | 414/703 |
| 3,897,880 | 8/1975 | Waske | 414/24.5 |
| 3,934,726 | 1/1976 | Martin | 414/24.5 |
| 3,967,742 | 7/1976 | Meinert | 414/24.5 |
| 4,002,147 | 1/1977 | Feteri | 414/714 |
| 4,089,425 | 5/1978 | Baltz | 414/24.5 |

Primary Examiner—Trygve M. Blix
Assistant Examiner—D. W. Keen
Attorney, Agent, or Firm—Kokjer, Kircher, Bradley, Wharton, Bowman & Johnson

[57] ABSTRACT

A device for attachment to the three point hitch of a tractor to handle large cylindrical hay bales. The device includes a pair of tines for piercing one side of the bale and an elevated pivot arm which extends over the bale and has a hook on one end for piercing the opposite side of the bale. A tension spring urges the arm in a direction to pinch the bale between the tines and the hooked end of the arm. The bale is raised for transport when the lift arms of the three point tractor hitch are raised.

8 Claims, 4 Drawing Figures

U.S. Patent    Jan. 4, 1983    4,367,062
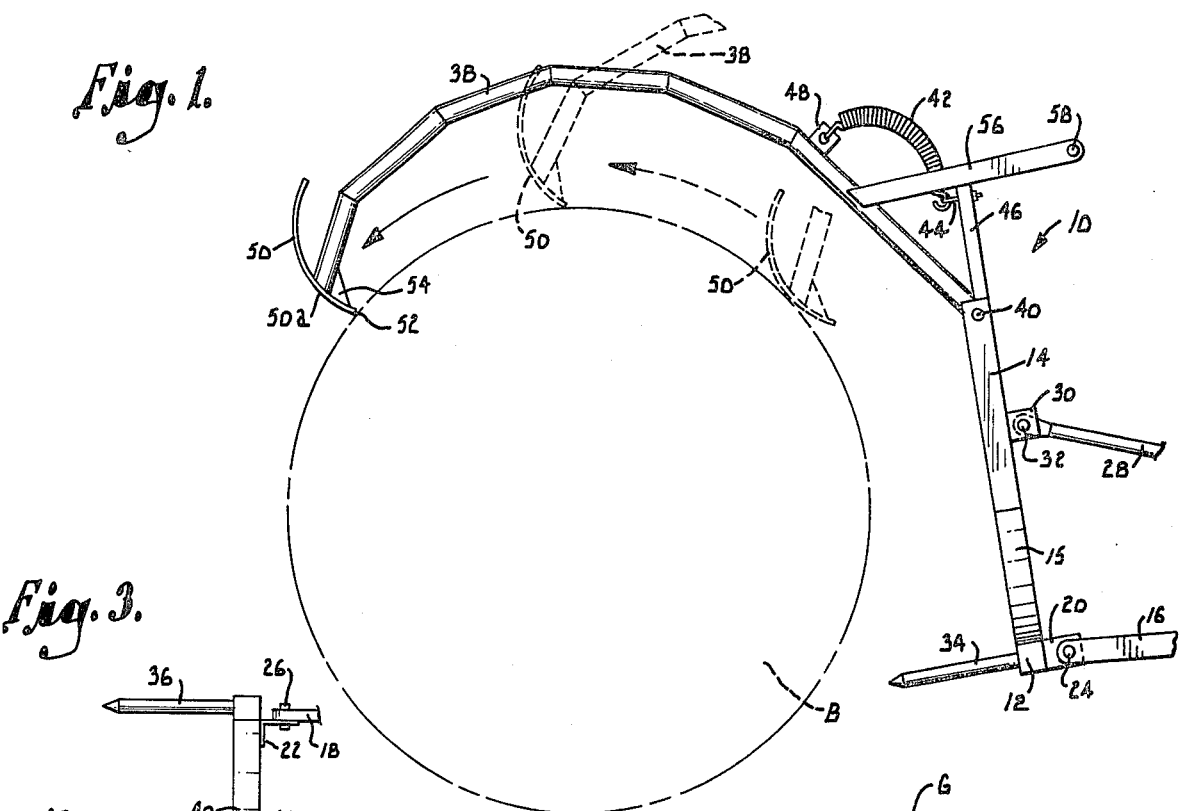
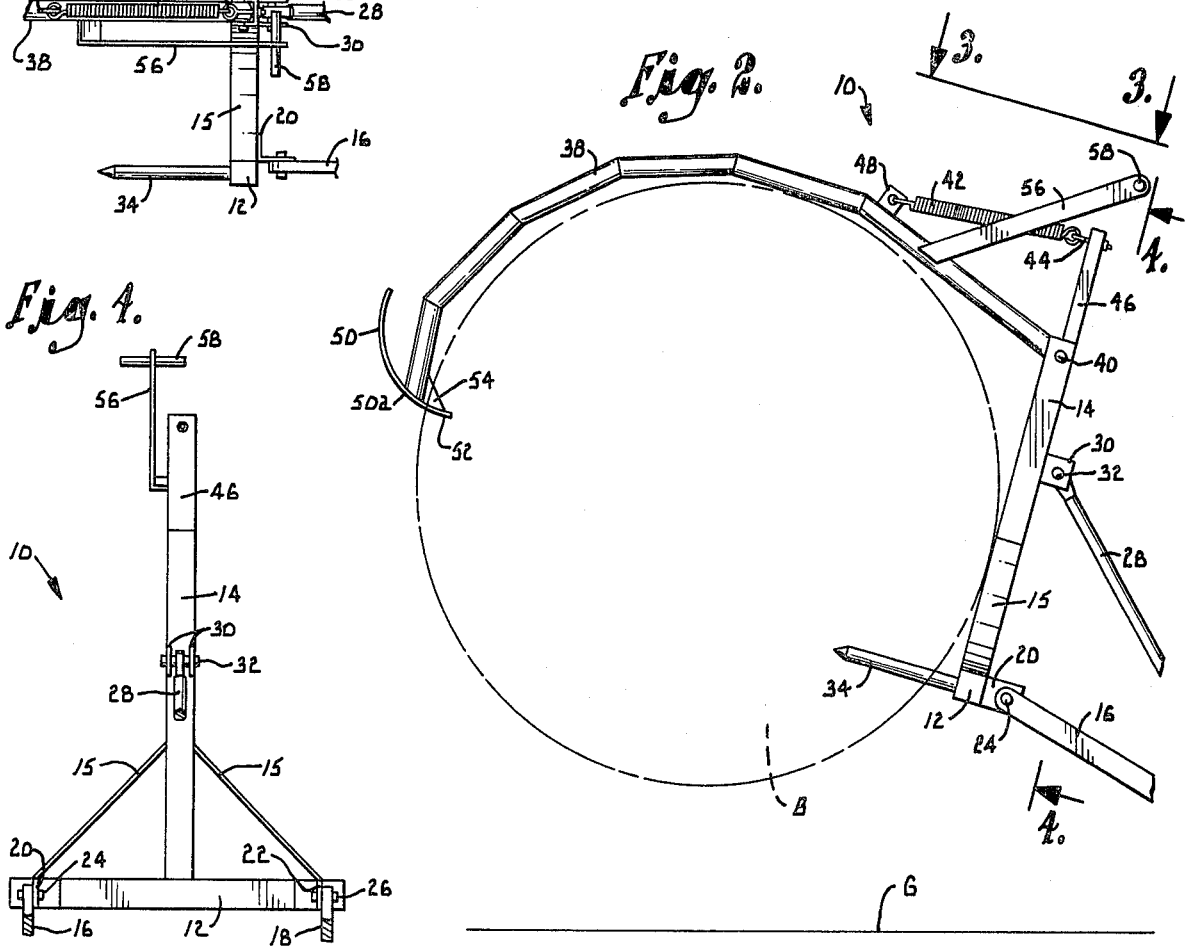

BALE CARRYING DEVICE

BACKGROUND AND SUMMARY OF THE INVENTION

In recent years, large cylindrical hay bales of several feet in diameter and weighing hundreds of pounds have become highly popular among farmers and ranchers. Due to the size and weight of the bales, they are difficult if not impossible to handle manually or with conventional equipment; consequently, various types of specialized hay handling devices have been proposed for carrying the large bales. However, these units have been less than satisfactory in a number of respects, most notably in their inability to handle the large bales in a safe manner. Equipment which requires a workman to assist in loading or unloading of the bale is generally undesirable in that the workman is exposed to the possibility of serious injury due to the bale falling on him. Personal injury and equipment damage can also result if the bale is maintained in an unstable position during transport.

Existing hay carriers are further characterized by undue cost and complexity and by reliability problems. For example, units such as that shown in U.S. Pat. No. 3,934,726 to Martin require a hydraulic cylinder which must be actuated to effect loading and unloading of the bale. The cost of the cylinder and the need for related equipment such as hydraulic lines and controls adds significantly to the cost and complexity of the device and also increases the maintenance requirements. In addition, if the cylinder is operated improperly or in an untimely manner, the bale will not be loaded and unloaded in the intended fashion.

It is an important object of the present invention to provide hay carrying apparatus which operates to safely load, transport and unload large cylindrical hay bales. The improved safety of the unit results primarily from the fact that it is normally completely operated from the driver's seat of a tractor. Consequently, workers are not subjected to the possibility of having the bale fall on them.

Another object of the invention is to provide hay carrying apparatus which can be attached to a standard three point tractor hitch and which does not require hydraulic cylinders or other complex power elements.

A further object of the invention is to provide hay carrying apparatus of the character described which is simple and economical to construct and which is reliable in operation.

An additional object of the invention is to provide hay carrying apparatus which is capable of unloading the bale in a precise location in a stackyard or other area having only limited space available.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a side elevational view of a hay carrying device constructed according to a preferred embodiment of the present invention, with the broken lines indicating the general path of the arm member of the device as it is applied to a large cylindrical hay bale;

FIG. 2 is a side elevational view similar to FIG. 1, but showing the bale lifted by the device to an elevated position for transport;

FIG. 3 is a fragmentary top plan view of the device taken generally along line 3—3 of FIG. 2 in the direction of the arrows; and FIG. 4 is a fragmentary view, partially in section, taken generally along line 4—4 of FIG. 2 in the direction of the arrows.

Referring now to the drawings in detail, numeral 10 generally designates a hay carrying device constructed in accordance with the invention. The hay carrying device 10 has a frame in the form of a horizontal beam 12 and a vertical post 14 which connects at its lower end with the midpoint of beam 12. Angled braces 15 extend between beam 12 and post 14 to strengthen the frame. The frame is constructed such that it can be attached to a conventional three point hitch mounted on the back of a tractor. The three point hitch of the tractor includes a pair of lower lift arms 16 and 18 which are pivotally connected with respective lugs 20 and 22 by pivot pins 24 and 26. Lugs 20 and 22 are spaced apart from one another and are welded or otherwise secured to the horizontal beam 12. The upper lift arm 28 of the tractor hitch is pivotally pinned between a pair of lugs 30 which are welded to post 14 at an intermediate location thereon. A pivot pin 32 is used to pivot the upper lift arm between lugs 30.

A pair of spikes or tines 34 and 36 are welded or otherwise secured to beam 12 near its opposite ends. The tines project rearwardly from beam 12 and have pointed tips on their ends for piercing a hay bale B.

A curved arm 38 is pivotally connected with the upper end of post 14. A horizontal pivot pin 40 is used to pin the arm to the post in a manner permitting the arm to pivot about the horizontal axis of the pin. Arm 38 may be formed in any suitable manner, such as by heating and bending it in a manner to provide the arm with a curvature that corresponds generally with the curvature of the bale B.

A tension spring 42 is connected between arm 38 and the frame of the device. One end of spring 42 is hooked to an eye bolt 44 which connects with the top end portion of a channel 46 forming an upward extension of post 14. Spring 42 thus connects with the frame at a location well above the pivot pin 40. The opposite end of the spring is hooked to a lug 48 which is welded to arm 38 at a location outwardly of the pivot pin 40. The free or bale engaging end of arm 38 is equipped with a curved metal strap 50 having a smoothly curved outer surface 50a for engaging the hay bale during application of the device thereto. The strap 50 is preferably welded to the end of the arm 38 and extends inwardly beyond the arm to provide a hook 52 for piercing of the bale. A small gusset plate 54 is welded to hook 52 and to the adjacent end portion of arm 38 to strengthen the hook.

A hand lever 56 is welded to arm 38 at a location between pivot pin 40 and lug 48. Lever 56 projects generally forwardly from the arm and extends forwardly of the frame such that its forward end is accessible to a worker standing forwardly of the bale. The forward end of the lever 56 is provided with a handle 58.

The hay carrying device is used to load, transport and unload hay bales such as the large cylindrical bale B. With bale B resting on the ground G or another surface, the tractor (not shown) is backed toward the bale as the lift arms 16, 18 and 28 of the three point hitch are simultaneously lowered. Spring 42 maintains the bale engaging back end of arm 38 at an elevation to initially contact the forward side portion of the bale at a location above center on the bale. The curved surface 50a of strap 50 engages the bale and rides along its curved upper surface as the frame of the device approaches the forward side of the bale. The path of the back end of arm 38 is shown in the broken line views in FIG. 1. The curved shape of surface 50a allows it to easily ride along and over the top portion of the bale without catching thereon.

The tines 34 and 36 are eventually moved adjacent the forward side portion of the bale at a location well below center on the bale. At this point, arm 38 is in the position shown in solid lines in FIG. 1, and hook 52 has been moved over the top of the bale and into engagement with its rearward side. Continued backing of the tractor causes tines 34 and 36 to pierce the forward side of the bale, and when the tines are fully inserted, hook 52 is engaged against the back side of the bale and spring 42 is either in an undeformed condition or is under slight tension. The curvature of arm 38 permits it to extend over the top of the bale without difficulty.

After the hay carrying device 10 has been applied to bale B in the manner indicated, the three point hitch of the tractor can be raised to lift the bale above the ground to the transport position shown in FIG. 2. As this occurs, bale B tends to roll to the rear and thereby causes hook 52 to penetrate its back side. The resultant tendency for arm 38 to be pulled downwardly causes the arm to pinch the bale and thus effects a pinching action which results in bale B being firmly pinched between hook 52 and tines 34 and 36 and which firmly maintains hook 52 in the bale. The tractor can then be driven forwardly to carry the bale to a desired location. Any tendency for the bale to drop out of the device is resisted by the pinching action of arm 38.

Unloading of the bale B is normally accomplished by lowering the three point hitch of the tractor until the bale contacts the ground. Preferably, the tractor is driven forwardly simultaneously, resulting in the bale rolling forwardly due to the action of arm 38. Once the tractor has moved forwardly far enough that hook 52 clears the top of the bale, continued forward movement of the tractor effects release of the hook and arm from the bale, thus completing the unloading operation. The device can then be used to load another bale or it can be discontinued from the tractor hitch for storage when not in use.

If the bale is to be unloaded in a stack yard or another area in which only limited space is available, the bale can be lowered to the ground at the desired position. Lever 56 can then be pulled generally downwardly to rotate arm 38 in a clockwise direction to effect release of hook 52 and arm 38 from the bale. The tractor can then be driven forwardly away from the bale. This manner of unloading assures that the bale is unloaded at precisely the location desired. In addition to maintaining arm 38 in the proper position for encountering the bale, spring 42 reduces the load applied to the arm and thus facilitates manual operation of lever 56 when unloading the bale at a fixed location.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Bale carrying apparatus for attachment to a lift mechanism of a traction vehicle to handle large cylindrical hay bales, said apparatus comprising:
    a frame adapted to be attached to the lift mechanism in a manner to be raised and lowered thereby;
    a pair of tines projecting from said frame at a location to pierce one side of a hay bale resting on the ground upon movement of the traction vehicle toward the bale;
    a curved arm member having a free end carrying a bale penetrating element for piercing a side of the bale opposite said one side thereof;
    means for pivotally coupling said arm member with said frame at a location generally above said tines and in a manner permitting free pivotal movement of the arm member about a generally horizontal pivot axis; and
    deformable spring means for normally holding said arm member at a position wherein the free end thereof is maintained at an elevation to engage said one side of the bale and to pass along and over the top of the bale in contact therewith and into engagement with said opposite side of the bale as the vehicle approaches the hay bale, and said tines penetrate said one side thereof, said bale penetrating element piercing said opposite side of the bale to effect pinching of the arm member toward the frame about said pivot axis when the bale tends to roll off of said tines during raising of the lift mechanism to lift the frame,
    whereby the bale is pinched between said tines and the free end of the arm member when the lift mechanism is raised to raise said frame and bale.

2. Apparatus as set forth in claim 1, including a hand lever connected with said arm member and adapted to be manually operated to pivot said arm member about said pivot axis in a generally upward direction to release said free end of the arm member from the bale.

3. Apparatus as set forth in claim 1, wherein said bale penetrating element comprises a hook for piercing said opposite side of the bale upon application thereto.

4. Apparatus as set forth in claim 1, including a curved surface on said free end of the arm member located to engage the hay bale and to ride over a curved top portion thereof as the vehicle moves toward the table.

5. Apparatus as set forth in claim 1, wherein said spring means comprises a tension spring having one end connected with said frame at a location above said pivot axis and an opposite end connected with said arm member at a location outboard of said pivot axis.

6. Apparatus as set forth in claim 1, wherein said frame includes a generally horizontal beam from which said tines project and a generally vertical post to which said arm member is pivotally coupled.

7. Apparatus as set forth in claim 6, wherein said spring means comprises a tension spring having one end connected with said arm member and an opposite end connected with said post at a location above said pivot axis, whereby the spring tension limits downward pivotal movement of said arm member to a position wherein said free end of the arm member is elevated sufficiently to initially contact said one side of the hay bale above center to pass along and over the top of and into engagement with said opposite side thereof upon movement of the traction vehicle toward the bale.

8. Apparatus as set forth in claim 7, including a curved surface on said free end of the arm member at a location to ride along said one side and the top portion of the bale upon movement of the vehicle toward the bale.

* * * * *